United States Patent Office 3,640,897
Patented Feb. 8, 1972

3,640,897
ACRYLAMIDE POLYMERS AS FLOCCULANTS IN RECOVERY OF NICKEL CATALYSTS
Alfred J. Restaino, Wilmington, Del., assignor to Atlas Chemical Industries, Inc., Wilmington, Del.
No Drawing. Filed Aug. 12, 1969, Ser. No. 849,495
Int. Cl. B01j *11/02, 11/30*
U.S. Cl. 252—412
1 Claim

ABSTRACT OF THE DISCLOSURE

An improved process for the recovery and production of supported nickel hydrogenation catalyst is disclosed. The improvement being in the washing and filtration step of the recovery of the nickel and precipitation of same on the support; namely silica or carbon, to form the unactivated "green catalyst" of the process.

---

This invention concerns an improved process for recovering supported nickel hydrogenation catalyst. More particularly, this invention concerns the use of nonionic and weakly anionic flocculants which aid in the precipitation, filtration and washing of the unactivated nickel catalyst.

It is an object of this invention to provide an improved process for the recovery of supported nickel catalyst used for hydrogenation type reactions.

Further objects of this invention will become obvious to those skilled in the art from the following detailed description of my invention.

In general nickel catalyst have been recovered by the following procedures. The nickel of the supported catalyst is removed from the support in a strong water acid bath, such as nitric acid bath. The organic matter, if any, which has adhered to the catalyst is thereby removed and a solution of nickel in an acid medium results. The carrier, in most cases silica or carbon, is left suspended in the acid bath. After the organic matter has been removed the solution is neutralized, by the addition of a base such as sodium hydroxide, sodium carbonate, ammonium hydroxide, lithium hydroxide or sodium bicarbonate forming salts in solution. The nickel precipitates and adheres to the carrier, which is then filtered from the neutralized water slurry and washed free of salt containing slurry water forming inactive catalyst called green catalyst. After this separation the green catalyst is passed through a reducing atmosphere to form the active nickel catalyst. During the washing and filtration step it is critical to completely wash the salt containing medium from the catalyst. If this washing is incomplete it will result in a less active final catalyst. To avoid this problem many solutions have been proposed in the past, such as careful neutralization to avoid excess alkali and thus make the catalyst more filterable, and use of excessive carrier to act as a filter aid. None of these, however, have satisfactorily solved the problem of difficult washing and filtration of this green catalyst. It was found, however, that a fast filtration and wash rate always meant good final catalyst.

In general, the improved process of this invention includes the addition, after neutralization with a strong base, of as little as about 1 part per million, by weight, of a nonionic or weakly anionic polymer flocculant to the slurry, based upon the total of bath and catalyst, and then the filtration and washing of the catalyst and activation per the normal procedure. This addition increases the filtration and washing, as measured by filtration time, and result in a purer green catalyst and a more active reduced catalyst.

It has been found that only particular flocculants can be used and achieve the faster filtrations indicative of better catalyst. In particular, these flocculants are high molecular weight homoploymers of acrylamide and copolymers of at least 50 weight percent acrylamide and vinylidene monomer of the general formula (1) 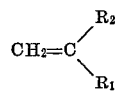

wherein $R_1$ can be carboxyl, a sulfonic radical or a phosphonic radical, and $R_2$ is a hydrogen radical or when $R_1$ is carboxyl radical a hydrogen radical or a methyl radical. In addition the water soluble salts of these vinylidene monomers [Formula 1] may be used in preparing the final polymer. These salts include calcium, sodium, lithium and other salts which result in water soluble polymers. A preferred group of salts are alkaline metal salts of said vinylidene monomers. By a nonionic catalyst is meant polyacrylamide. All of these polymers are characterized by having an intrinsic viscosity of at least 5 deciliters per gram at 25° C. in 2 N sodium chloride solution. Exemplary of these flocculants are pure polyacrylamide and 50/50 copolymer of polyacrylamide and acrylic acid, a 95/5 copolymer of acrylamide and vinyl sulfonic acid, an 80/20 copolymer of acrylamide and vinyl phosphonic acid and a 70/30 copolymer of acrylamide methacrylic acid.

Temperature has been found to aid this filter process; that is, the higher the temperature the better the filtration and wash rates of the process.

The concentration of the flocculant also affects filter rate. As the concentration goes below 1 part per million, the flocculant is present in such small quantities that it is below its useful level and little or no improvement will be evident in filtration and wash time. An upper limit of flocculant cannot be explicitly set. The maximum amount of flocculant compatible with the process is that level at which the flocculant will not interfere with filtration, that is depending upon which flocculant is used, within the group disclosed above, there may be a different upper limit beyond which filtration is not aided, but rather hindered. The higher levels of flocculant compatible with improved filtration are desirable, however, where aggregation of fine catalyst particles is needed, which naturally results in faster settling.

To determine the upper limit of any particular flocculant, within said group of flocculants, incremental amounts of flocculants are added to a catalyst slurry. These incremental amounts are usually 5 parts per million by weight based upon slurry added; when a level is reached beyond which no improvement is found the upper level is established. In general concentrations as high as 20 parts per million are effective.

In this process the flocculant is added as an aqueous solution. The concentration of this solution is usually from about .01 to 1.0 weight percent flocculant. However, concentrations as low as .001 and as high as 3 weight percent are effective.

A preferred embodiment of this process entails the addition, as a .01 to 1.0 weight percent solution, of approximately 1½ to approximately 3 parts per million, of flocculant, based upon the total weight of slurry, and filtration at a temperature of from about 60° C. to about 100° C.; the preferred flocculant being a copolymer of acrylamide and acrylic acid in a proportion of from about 94% acrylamide to about 98% acrylamide in the final polymer.

To judge the effectiveness of the flocculant in improving the quality of the green catalyst slurry, batches of slurry were prepared with various concentrations of flocculant by adding, to 500 cc. of slurry, flocculant as a 0.1 weight percent solution. A 500 cc. sample of slurry without flocculant was then filtered and its filtration rate compared to that of a sample with flocculant. The percent change in rate was calculated by the standard formula $$\text{Percent change} = \left(\frac{\text{rate with flocculant}}{\text{rate without flocculant}} - 1\right) \times 100$$

where rate is cc./sec. All increases show that the green catalyst will wash and filter better yielding a purer and more active final catalyst. The results of seven samples are given in Examples 1 through 7. Example 7 is presented to show an excessive amount of flocculant and how this large a dose does not improve filtration rate. As such it is outside of the subject invention. The filtration temperature for Examples 1 to 9 is 25° C.

genation catalyst wherein a spent supported nickel hydrogenation catalyst is contacted with an aqueous solution of a strong acid to form a slurry of catalyst carrier and an acidic aqueous solution of nickel, the slurry is then neutralized with a base, thereby precipitating the nickel onto the surface of the catalyst carrier resulting in an inactive supported nickel hydrogenation catalyst-water slurry, and said inactive catalyst is then removed from said water slurry and activated in a reducing atmosphere; the steps which comprise the addition of a flocculating agent, at a concentration from 1 part per million to about 20 parts per million, to said inactive supported hydrogenation catalyst-water slurry prior to filtration and washing of said catalyst, said slurry having a solids content of

EXAMPLES 1-7

| Example Number | Quantity of slurry cc. | Concentration of green catalyst (weight percent) | Flocculant | Concentration of flocculant (parts/million) | Filtration time of sample (seconds) | Improvement in filtration rate (percent) |
|---|---|---|---|---|---|---|
| 1 | 500 | 24.4 | 95-5 copolymer of arcylamide and acrylic acid | 10 | 920 | 25 |
| 2 | 500 | 24.4 | do | 7.5 | 910 | 26.5 |
| 3 | 500 | 24.4 | do | 5.0 | 887 | 31.0 |
| 4 | 500 | 24.4 | do | 2.5 | 940 | 22.5 |
| 5 | 500 | 24.4 | 80-20 copolymer of acrylamide and acrylic acid | 5.0 | 950 | 18 |
| 6 | 500 | 24.4 | 50-50 copolymer of acrylamide and acrylic acid | 5.0 | 1,080 | +3.0 |
| 7 | 500 | 24.4 | 95-5 copolymer of acrylamide and acrylic acid | 50 | 1,130 | -8.0 |

To better enable one skilled in the art to practice this invention further examples of addition of flocculant are now given.

EXAMPLE 8

To one-thousand cc. of green catalyst slurry, at a concentration of 20% solids is added 7 parts per million of a copolymer of vinyl sulfonic acid and acrylamide as a 0.5 weight percent solution. The copolymer contains 8% of vinyl sulfonic acid, the remainder being acrylamide. This flocculant slury is then filtered through a 5″ Buchner funnel and results in an improved filtration rate.

EXAMPLE 9

To 5000 liters of 20 weight percent solids-green catalyst slurry is added a 1.0 weight percent solution of a 90-10 weight percent copolymer of acrylamide and methacrylic acid until the concentration of 5 parts per million in the slurry is reached. This slurry is then filtered through a plate and frame press and the filter cake washed with 5000 liters of water. This results in improved filtration and wash rates.

EXAMPLE 10

According to the procedure of Example 9, 5000 liters of an 18 weight percent solids-green catalyst slurry is treated with an acrylamide homopolymer at a concentration of 4 parts per million. The resulting slurry is filtered and then is washed with 3000 liters of water. This results in improved filtration and wash rates.

Having thus described my invention, I claim:

1. In a process for recovering supported nickel hydrogenation catalyst wherein a spent supported nickel hydrogenation catalyst is contacted with an aqueous solution of a strong acid to form a slurry of catalyst carrier and an acidic aqueous solution of nickel, the slurry is then neutralized with a base, thereby precipitating the nickel onto the surface of the catalyst carrier resulting in an inactive supported nickel hydrogenation catalyst-water slurry, and said inactive catalyst is then removed from said water slurry and activated in a reducing atmosphere; the steps which comprise the addition of a flocculating agent, at a concentration from 1 part per million to about 20 parts per million, to said inactive supported hydrogenation catalyst-water slurry prior to filtration and washing of said catalyst, said slurry having a solids content of about 24 weight percent, and then filtering said slurry and washing the filter cake with water, said flocculating agent is a copolymer containing about 95% by weight of polymerized acrylamide and about 5% by weight of polymerized acrylic acid and having an intrinsic viscosity of at least 5 deciliters per gram as determined in two normal sodium chloride solution at 25° C.

References Cited

UNITED STATES PATENTS

| 1,940,652 | 12/1933 | Semmes | 252—413 |
| 3,033,782 | 5/1962 | Rauch et al. | 210—54 |
| 3,479,284 | 11/1969 | Lees | 210—54 |
| 3,480,761 | 11/1969 | Kolodny et al. | 210—54 |
| 3,488,718 | 1/1970 | Innes et al. | 23—61 X |

FOREIGN PATENTS

| 47,245 | 11/1918 | Sweden | 252—413 |
| 49,364 | 11/1918 | Sweden | 252—412 |
| 3,053 | 4/1919 | Netherlands | 252—413 |
| 33,928 | 1/1922 | Norway | 252—413 |
| 960,670 | 6/1964 | Great Britain | 252—413 |
| 1,262,977 | 3/1968 | Germany | 252—413 |

DANIEL E. WYMAN, Primary Examiner

P. E. KONOPKA, Assistant Examiner

U.S. Cl. X.R.

23—61; 210—54; 252—413, 420, 430, 459, 466 J, 472